(12) United States Patent
Sheahan, Jr. et al.

(10) Patent No.: US 7,277,800 B2
(45) Date of Patent: Oct. 2, 2007

(54) FREEPLAY MONITOR

(75) Inventors: James J. Sheahan, Jr., Florissant, MO (US); Jeffrey M. Roach, St. Charles, MO (US); Kevin L. Swearingen, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/364,644

(22) Filed: Feb. 28, 2006

(65) Prior Publication Data

US 2007/0203656 A1   Aug. 30, 2007

(51) Int. Cl.
*G01B 3/44* (2006.01)

(52) U.S. Cl. .......................... 702/34; 702/33; 702/113; 702/182; 700/175

(58) Field of Classification Search ................ 702/34, 702/33, 182, 113; 244/223, 234, 196; 700/175, 700/176
See application file for complete search history.

(56) References Cited

U.S. PATENT DOCUMENTS

| | | | |
|---|---|---|---|
| 5,092,539 A | 3/1992 | Caero | |
| 5,262,717 A | 11/1993 | Bolegoh | |
| 6,446,519 B1 | 9/2002 | Biester | |
| 6,453,761 B1 | 9/2002 | Babinski | |
| 6,529,135 B1 | 3/2003 | Bowers et al. | |
| 6,745,151 B2 | 6/2004 | Marko et al. | |
| 6,834,256 B2 | 12/2004 | House et al. | |
| 2005/0278148 A1 | 12/2005 | Bader et al. | |

FOREIGN PATENT DOCUMENTS

WO  WO 2005/124488  12/2005

OTHER PUBLICATIONS

U.S. Appl. No. 11/291,709, filed Dec. 1, 2005, Blanding et al.

*Primary Examiner*—John Barlow
*Assistant Examiner*—Hien Vo
(74) *Attorney, Agent, or Firm*—Harness, Dickey & Pierce, P.L.C.

(57) ABSTRACT

A system and method for monitoring freeplay within an actuator is provided. In accordance with various embodiments, the method includes collecting a plurality of actuator parameter data sets during a predetermined period. During the predetermined time period the actuator drive motor is commanded to extend and retract an actuator output ram operably connected to a movable component of a structural system such as a mobile platform. The method additionally includes selectively isolating various sets of the plurality of actuator parameter data sets that meet specific predetermined criterion. Furthermore, the method includes computing an amount of freeplay value within the actuator based on the isolated actuator parameter data sets.

20 Claims, 5 Drawing Sheets

FREEPLAY MONITOR

GOVERNMENT RIGHTS

The subject matter of the present disclosure was made with Government support under contract F33615-03-2-2306, awarded by the United State Air Force, and in which the, Government has certain rights.

FIELD

The present disclosure relates to electro-mechanical actuators and, more particularly, to a freeplay or mechanical wear monitor for an electro-mechanical actuator.

BACKGROUND

Many structural systems, e.g., mobile platforms such as aircraft, trains, ships, buses, etc., employ actuators, e.g., electro-mechanical actuator (EMAs), to control the movement of various components of the structural system. For example, actuators can be utilized in aircraft to control the movement of access doors, landing gear, flight control surfaces, and other aircraft components. Throughout the operational life of an actuator, mechanical wear, sometimes referred to as 'freeplay', increases in the actuator motors, bearings, gears, and other elements of the actuator drive train. Such wear is difficult to measure and to predict, resulting in the need for periodic ground-based tests. Typically, actuator testing requires unique ground-based support equipment and is very time consuming to conduct. Additionally, some implementations of actuators, e.g., aircraft actuators or EMAs, may require freeplay/mechanical wear measurement as frequently as every fifty hours of use, and each set of measurements may take eight to sixteen maintenance man-hours to complete. Often times the structural system must be shut down or otherwise rendered inoperable during mechanical wear testing. For example, an aircraft is typically unavailable for flight during freeplay testing. In some cases, wear can only be assessed in a laboratory, necessitating complete removal of functioning equipment from the structural system. The maintenance hours required, the maintenance training to conduct the wear tests, the equipment to conduct the tests, and the down time of the structural system all add significant monetary and temporal costs to actuator freeplay testing.

BRIEF SUMMARY

The present disclosure provides a system and method for monitoring freeplay within an actuator, e.g., an electro-mechanical actuator (EMA). In accordance with various embodiments, the method includes collecting a plurality of actuator parameter data sets during a predetermined period. During the predetermined time period the actuator motor is commanded to extend and retract an actuator output ram operably connected to a movable component of a structural system such as a mobile platform. The method additionally includes selectively isolating various sets of the plurality of actuator parameter data sets that meet specific predetermined criterion. Furthermore, the method includes computing an amount of freeplay value within the actuator based on the isolated actuator parameter data sets.

Further areas of applicability of the present disclosure will become apparent from the detailed description provided hereinafter. It should be understood that the detailed description and specific examples, while indicating the various embodiments of the disclosure, are intended for purposes of illustration only and are not intended to limit the scope of the disclosure. Furthermore, the features, functions, and advantages of the present disclosure can be achieved independently in various embodiments of the present disclosure or may be combined in yet other embodiments.

BRIEF DESCRIPTION OF THE DRAWINGS

The present disclosure will become more fully understood from the detailed description and accompanying drawings, wherein.

Corresponding reference numerals indicate corresponding parts throughout the several views of drawings.

DETAILED DESCRIPTION

The following description is merely exemplary in nature and is in no way intended to limit the disclosure, its application or uses. Additionally, the advantages provided by the various embodiments, as described below, are exemplary in nature and not all embodiments provide the same advantages or the same degree of advantages.

Figure 1:
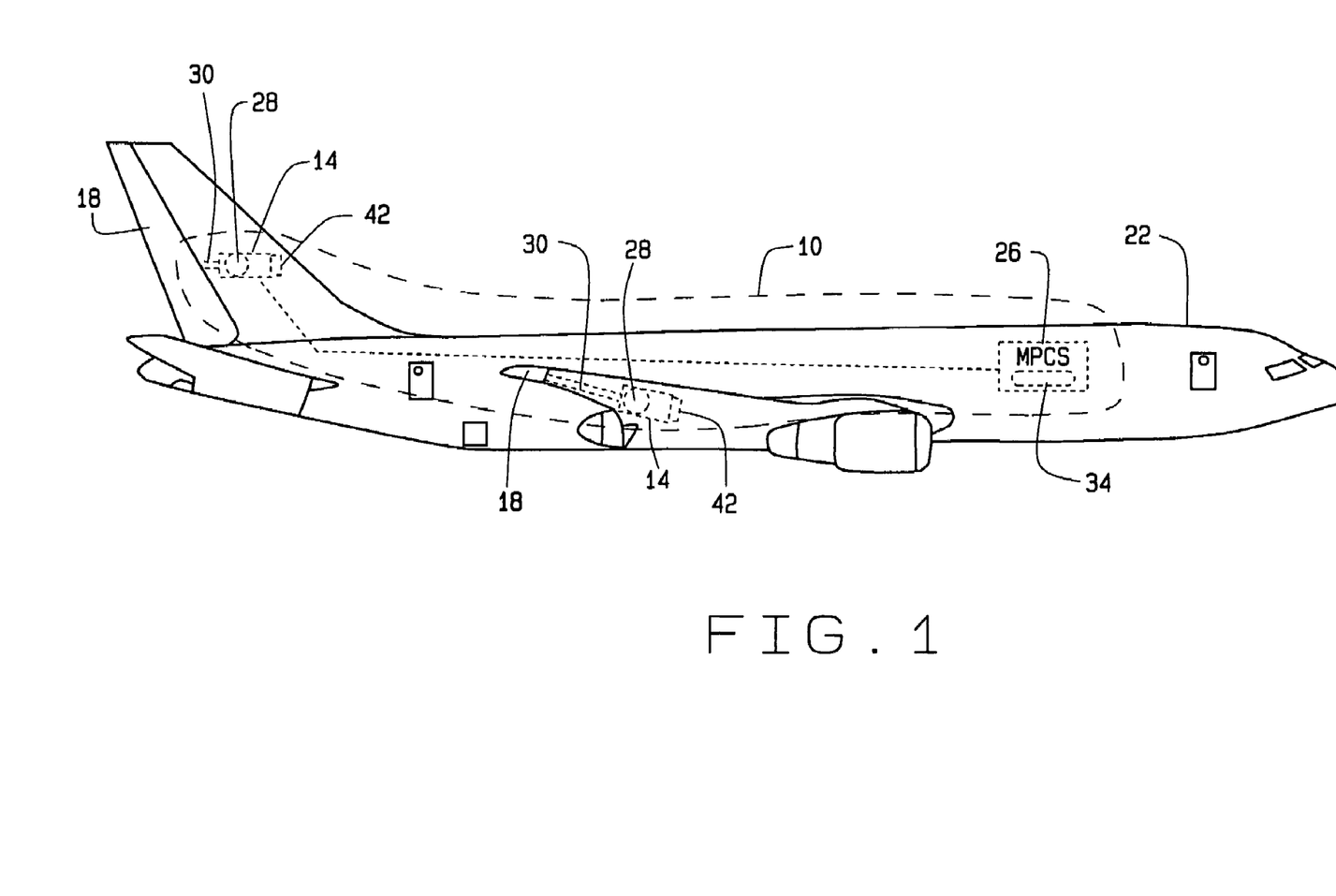
FIG. 1 is an illustration of a structural system including a freeplay monitoring system (FPS) for at least one actuator, in accordance with various embodiments of the present disclosure.

The Referring to FIG. 1, in various embodiments, a mechanical wear management system (MWMS) 10 is provided for measuring and monitoring the mechanical wear of at least one actuator 14, for example an electro-mechanical actuator (EMA), a digital linear motor or any other electrical motor driven system with a positional output. Since mechanical wear within an actuator is often referred to as the freeplay of the actuator, the MWMS 10 will also be referred to herein as the freeplay management system (FMS) 10. Each actuator 14 controls the movement of at least one component 18 of a structural system 22, such as a mobile platform. For example, each actuator 14 can control the movement of a control surface of an aircraft. Although the structural system 22 is exemplarily illustrated in FIG. 1 as an aircraft, the structural system 22 is not limited to aircraft or other mobile platforms such buses, ships, trains or other vehicles. The structural system 22 can be any structural system that incorporates one or more actuators 14 to control the movement of at least one component 18 of the structural system 22. For example, the structural system 22 could be a heating, ventilation and air conditioning system that incorporates one or more actuators 14 to control the movement of one or more louvers, shutters, turrets or valves for controlling the direction and/or volume of air flow. Furthermore, although each actuator 14 is exemplarily illustrated in FIG. 1 as a single actuator, it should be understood that the FMS 10 can be utilized to measure and monitor the freeplay of multiple of interconnected actuators 14. For example, a plurality of interconnected actuators 14 can be incorporated to provide redundancy and/or added control of the structural component(s) 18, and remain within the scope of the disclosure.

The FMS 10 includes the one or more actuators 14 and a mobile platform computing system (MPCS) 26 of the structural system 22 that can control and/or monitor various operations of the structural system 22. For example, the MPCS 26 can be the main computer-based management system of an aircraft that controls such things as transmission of pilot commands and monitors such things as air speed, gravitational forces on the aircraft and amount of deflection of various aircraft control surfaces. Although it should be understood that the FMS 10 can be employed to substantially simultaneously measure and monitor the freeplay of one or more actuators 14, for simplicity and clarity, the one or more actuators 14 will generally be referred to herein in the singular, i.e., simply as the actuator 14. Similarly, although it should be understood that each actuator 14 can be operatively connected to one or more components 18, for simplicity and clarity, the one or more components 18 will generally be referred to herein in the singular, i.e., simply as the component 18.

Generally, when the actuator 14 is commanded to drive an actuator output ram 30, e.g., extend or retract the output ram 30, one or more actuator drive motors 28, included in the actuator 14, will move a certain rotational distance before engaging the output ram 30 and driving the output ram 30 to change position of the system component 18 operably connected to the output ram 30. The rotational distance the drive motor(s) 28 move prior to engagement with the output ram 30 is the mechanical freeplay. Freeplay measurements can vary somewhat based on external factors, but long term trends are identifiable, and while the absolute freeplay measurement is important, significant changes in freeplay measurements over time and use of the actuator 14 are much more important. Typically, only a very small amount of freeplay in an actuator, such as actuator 14, is allowable. For example, allowable freeplay in an aircraft actuator can be on the order of only a few thousandths of an inch, e.g., 10-12 thousandths of an inch. Such small measurements of distance are susceptible to sensor and transmission noise and freeplay measurement can be distorted due to external loads on the actuator ram 30. Freeplay measurement can also be impacted by the speed and velocity of the drive motors 28 and the linear displacement of the output ram 30.

Figure 2:
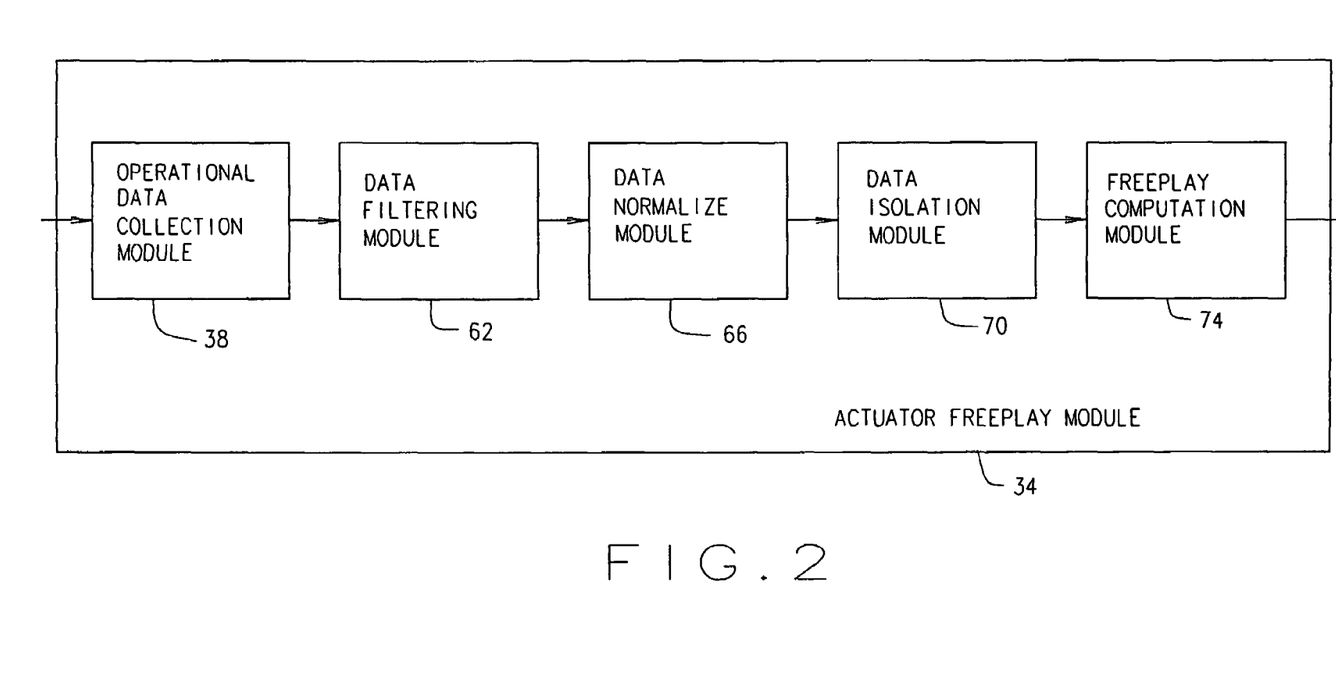
FIG. 2 is a block diagram illustrating an actuator freeplay monitor module included in the freeplay monitoring system shown in FIG. 1.

Referring now to FIGS. 1 and 2, in various embodiments, the FMS 10 additionally includes an actuator freeplay module 34 that is a software based module or routine executable by any suitable processor or microprocessor. For example, in various embodiments, the actuator freeplay module 34 can be included in the MPCS 26 and executed by an MPCS processor (not shown). Accordingly, for illustration purpose only, the actuator freeplay module 34 is shown in FIG. 1 as being included in the MPCS 26, but could be included as part of any other computer-based subsystem of the structural system 22 or remote computer-based system communicatively connected to the MPCS 26 via wired or wireless communication. The actuator freeplay module 34 provides a software model for measuring and monitoring the mechanical wear of the at least one actuator 14 by comparing a motor position to an output ram position during specific periods where various actuator operating parameters are within defined ranges.

Generally, the actuators freeplay module 34 measures and monitors the position of the drive motor 28, the output ram 30 and various other selected actuator operating parameters, such as the velocity and acceleration of the drive motor 28, during operation of the actuator 14. Thus, the actuators freeplay module 34 is executed to collect a plurality of actuator parameter data sets during a predetermined period as the drive motor 28 is commanded to repeatedly drive the output ram 30 to extend and retract output ram 30. Each actuator parameter data set includes a data reading or value for each of the monitored actuator operational parameters as a function of time. Once the actuator parameter data sets are collected, the actuators freeplay module 34 selectively isolates various ones of the actuator parameter data sets that meet specific predetermined criterion. That is, each of the actuator parameter data sets wherein each data value within the set is within a predetermined range specific to each type of data collected, i.e., motor position data, output ram position data, motor velocity data and motor acceleration data, is isolated from the non-qualifying data sets. Then, based on the isolated actuator parameter data sets, an amount of freeplay value is computed for that particular data collection period.

More specifically, in various embodiments, the actuator freeplay module 34 includes an actuator operational data collection module or routine 38 that collects the various measured operational parameters monitored by an actuator controller 42 included in the actuator 14. The actuator operation data collection module 38 is executable during execution of the actuators freeplay module 34. To operate the actuator 14, the actuator controller 42 receives commands from a command source, e.g., the MPCS 26, that instructs the actuator 14 to move the component 18 to a desired position. In response to the command, the actuator controller 42 commands the drive motor 28 to move the output ram 30 and impart movement of the component 18. As described further below, during selectable periods of operation of the actuator 14, the actuator controller 42 measures the operational parameter values and inputs the values to the actuators freeplay module 34. In various embodiments, during any selected period of time, the actuator operational data collection module 38 collects data relating to: the position of the drive motor 28 as the drive motor 28 operates the output ram 30 (motor position data); the position of the output ram 30 as it extends and/or retracts as driven by the drive motor 28 (ram position data); the rotational velocity of the drive motor 28 as the drive motor 28 operates to drive the output ram 30 (motor velocity data); and the acceleration of the drive motor 28 as the drive motor 28 operates the output ram 30 (motor acceleration data). In some implementations, the motor acceleration data can be computed from the motor velocity data.

Figure 3:
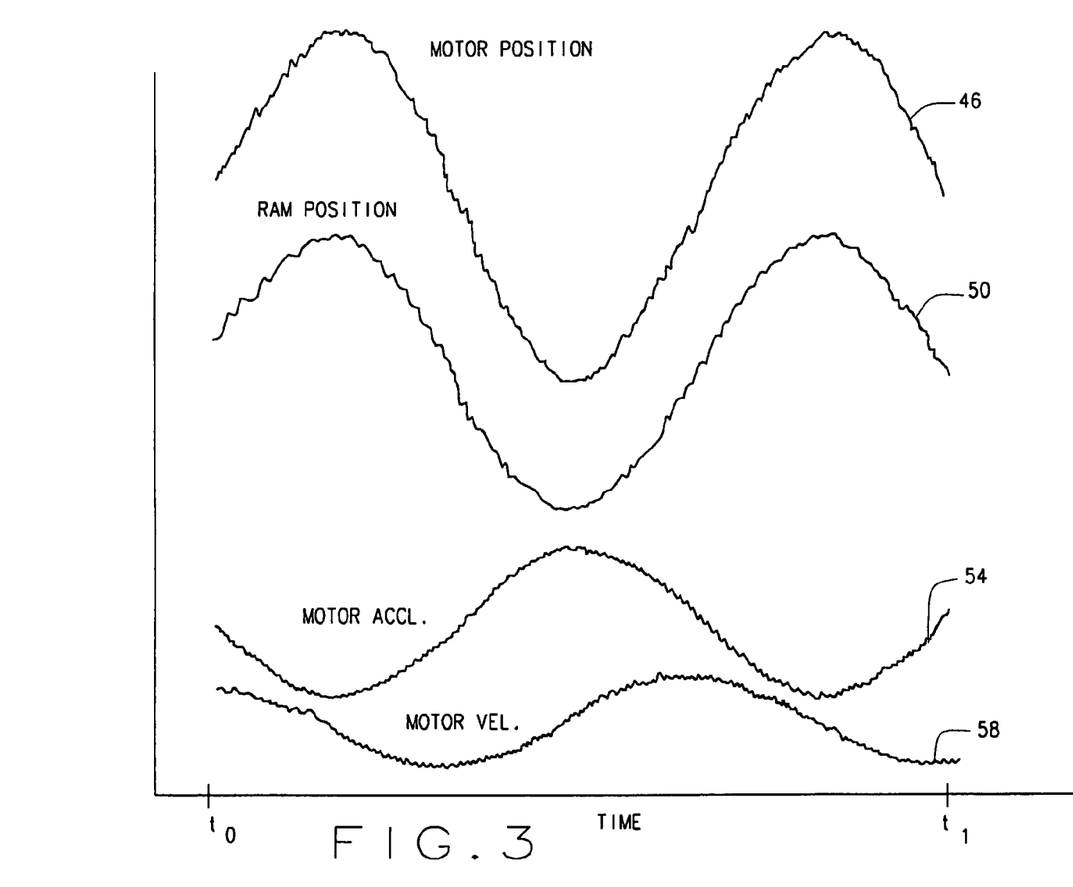
FIG. 3 is an exemplary graphical representation of various actuator operational data collected by the freeplay monitor module shown in FIG. 2.

FIG. 3 shows exemplarily waveforms illustrative of motor position data 46, ram position data 50, motor acceleration data 54 and motor velocity data 58, collected by the operational data collection module 38 during a desired period, e.g., from $t_0$ to $t_1$, in accordance with various embodiments. It should be understood that the waveforms illustrated in FIG. 3 are merely illustrative and do include all possible data collections waveforms. More particularly, the data collection waveforms can have essentially an applicable form, such as a square wave, a saw-tooth wave or asymmetrical wave form. As illustrated in FIG. 3, the actuator operational data collected by the operational data collection module 38 during any desired period, e.g., from $t_0$ to $t_1$, and include noise induced by such things as signal spikes, variances in the sensors (not shown) of the actuator 14 that read or monitor each of the parameters, electromagnetic interference from the actuator 14, the speed and velocity of the drive motor 28, the linear displacement of the output ram 30 or other operating systems around the actuator 14 and/or physical vibrations or movement of the structural system 22.

Figure 4:
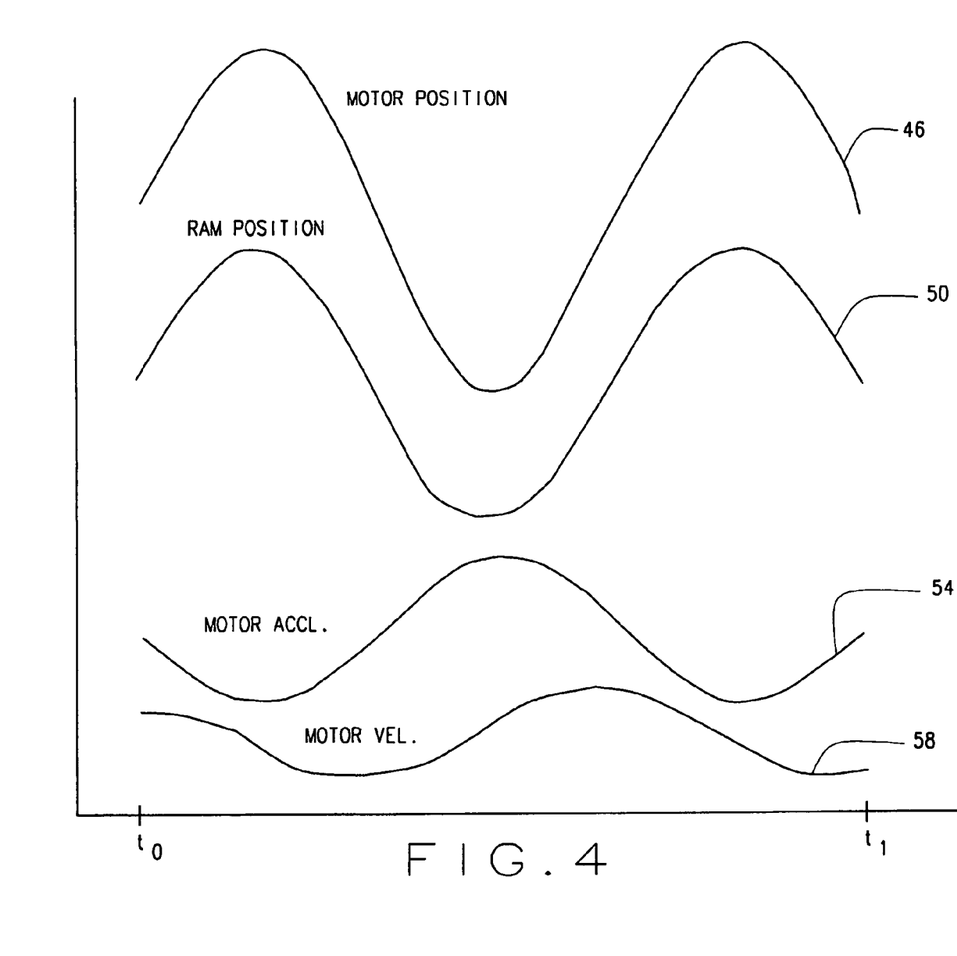
FIG. 4 is an exemplary graphical representation of the actuator operational data shown in FIG. 3 after being filtered by the freeplay monitor module shown in FIG. 2.

To smooth or filter any such noise from each of the operational parameter data 46, 50, 54 and 58, the actuators freeplay module 34 includes a data filtering module or routine 62, executable during execution of the actuators freeplay module 34. The operational data collection module 38 outputs the operational parameter data curves 46, 50, 54 and 58 to the data filtering module 62, where the data in each of the data curves 46, 50, 54 and 58 is filtered or smoothed. More particularly, to account for any phase shifting of any of the operational parameter data waveforms 46, 50, 54 and 58, each data waveform 46, 50, 54 and 58 is filtered in an effectively identical manner. Thus, each operational data waveform 46, 50, 54 and 58, for each collection period, e.g., from $t_0$ to $t_1$, is effectively identically filtered, resulting in the exemplary filtered data waveforms illustrated in FIG. 4.

Figure 5:
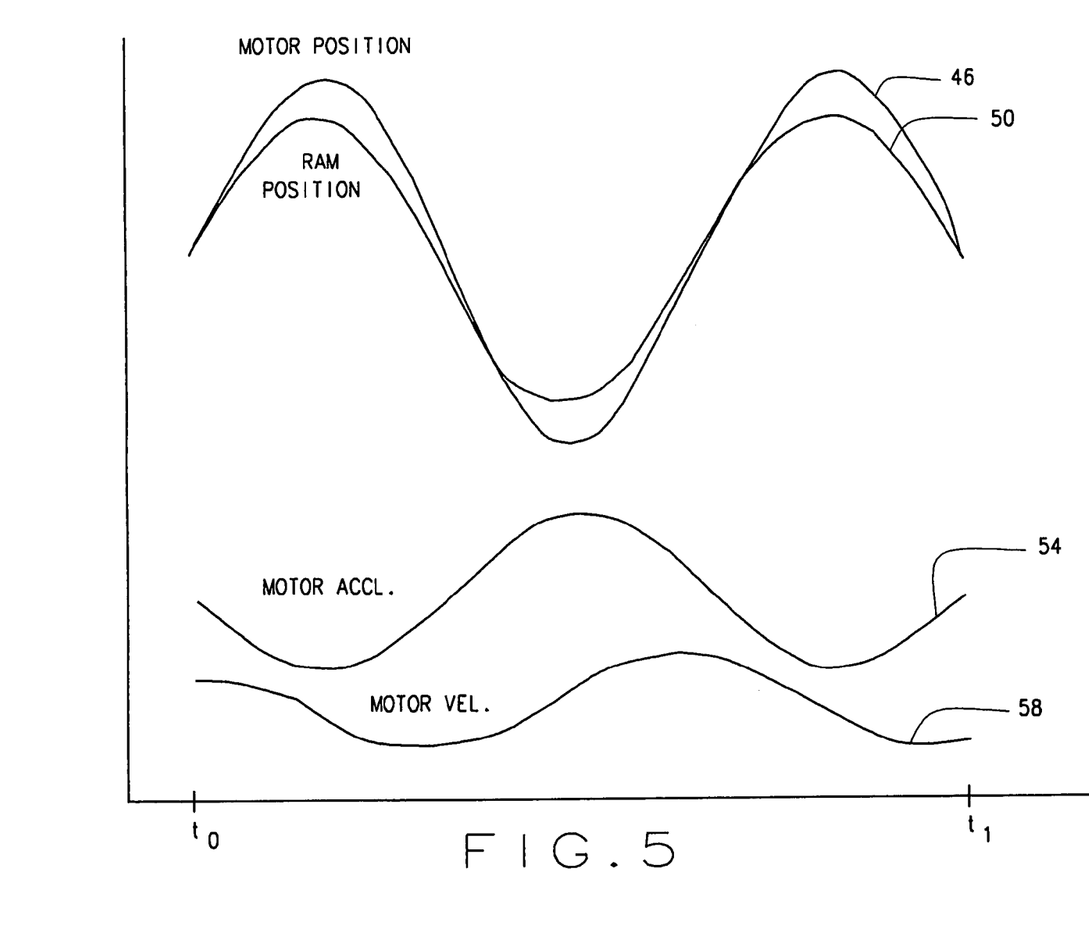
FIG. 5 is an exemplary graphical representation of a motor position data curve and an output ram data curve, both shown in FIG. 4, after being normalized by the freeplay monitor module shown in FIG. 2.

Referring now to FIGS. 2 and 5, in various embodiments, the actuators freeplay module 34 further includes a data normalization module or routine 66, executable during execution of the actuators freeplay module 34. The filtered data from the data filtering module 62 is input to the data normalization module 66. The data normalization module 66 normalizes the motor position data 46 with the output ram data 50. In various implementations, the data normalization module 66 computes a mean for each of the motor position data 46 and the output ram position data 50. The data normalization module 66 then shifts one or both of the motor position data waveform 46 and the output ram position data waveform 50 so that the means match. For example, the data normalization module 66 can shift the output ram data waveform 50, i.e., add or subtract to or from each value of the output ram data waveform, so that the mean of the output ram data waveform 50 is substantially the same as the mean of the motor position data waveform 46. Normalizing the motor position data 46 and the output ram position data 50 accounts for any offset that may exist between the drive motor 28 position and the output ram 30 position when the drive motor 28 is initially activated.

Each of the operational parameters monitored, e.g., the drive motor 28 position, output ram 30 position, drive motor 28 acceleration and drive motor 28 velocity, can be sampled, i.e., collected, at any desirable rate. For example, each of the operational parameters can be sampled at between 100 Hz and 400 Hz, such that a data value can be collected for each operational parameter 100 to 400 times a second. In various exemplary embodiments, the actuators freeplay module 34 samples the data at 100 Hz. That is, the actuator freeplay module 34 collects a data value for each operational parameter every $\frac{1}{100}^{th}$ of a second during the desired data collection period, e.g., from $t_0$ to $t_1$. Thus, each of the operational data curves 46, 50, 54 and 58 comprises a predetermined number of data values based on the selected sampling rate at which the data is collected by the operational data collection module 38. Accordingly, the actuators freeplay module 34 collects a predetermined number of operational parameter data sets, each data set comprising a single data value for each of the operational parameters monitors, in accordance with the selected sampling rate. For example, if the sampling rate is selected to be 100 Hz, the operational data collection module collects a data set every $\frac{1}{100}^{th}$ of a second. The operational data values are filtered and normalized, as described above, by the data filtering module 62 and the data normalization module 66, resulting in a predetermined number of filtered and normalized operational parameter data sets, based on the sampling rate. The actuators freeplay module 34 further includes a data isolation module or routine 70, executable during execution of the actuators freeplay module 34. The data isolation module 70 receives the filtered and normalized operational parameter data waveforms 46, 50, 54 and 58 from the data normalization module 70. As described above, comprehensively, the operational parameter data waveforms 46, 50, 54 and 58 comprise a predetermined number of operational parameter data sets. The data isolation module 70 evaluates each data set to determine whether each of the data sets meet a predefined set of conditions. Specifically, the data isolation module 70 evaluates each data set to determine whether each of the data values within each data set is within a predetermined desirable range specific to the operational parameter. More particularly, the data isolation module 70 evaluates the motor position data value within each data set to determine which data sets include an 'acceptable' motor position data value, i.e., a motor position data value within a predetermined desirable range of motor position values. If the motor position data value for a particular data set is outside of the 'acceptable' range, that particular data set is discarded and not utilized to determine the actuator freeplay for the selected time period, e.g., from $t_0$ to $t_1$, as described below.

Additionally, the data isolation module 70 evaluates the output ram position data value within each data set to determine which data sets include an 'acceptable' output ram position data value, i.e., an output ram position data value within a predetermined desirable range of output ram position values. If the output ram position data value for a particular data set is outside of the 'acceptable' range, that particular data set is discarded and not utilized to determine the actuator freeplay for the selected time period, e.g., from $t_0$ to $t_1$, as described below. Similarly, the data isolation module 70 evaluates each of the motor velocity and acceleration data values within each data set to determine which data sets include an 'acceptable' motor velocity data value and/or an 'acceptable' motor acceleration data value. That is, a motor velocity data value within a predetermined desirable range of motor velocity values and a motor acceleration data value within a predetermined desirable range of motor acceleration values. If either the motor velocity data value or the motor acceleration data value for a particular data set is outside of the 'acceptable' range, that particular data set is discarded and not utilized to determine the actuator freeplay for the selected time period, e.g., from $t_0$ to $t_1$, as described below. Therefore, the data isolation module 70 isolates all the data sets wherein each of the data values of the data set are within the defined respective 'acceptable' ranges.

The isolated data sets, i.e., the data sets that have met all the predefined conditions by having each of the data values within the defined respective 'acceptable' ranges, are then output to a freeplay computation module 74. Utilizing the 'acceptable' data sets, the freeplay computation module 74 is executed to determine an amount of freeplay for the selected time period, e.g., from $t_0$ to $t_1$. To compute the freeplay value, the freeplay computation module 74 calculates the difference between the motor position data value and the output ram position data value for each of the isolated data sets. Once this difference is calculated for each of the isolated data sets, the freeplay computation module 74 computes the mean of the absolute values for all the calculated differences. This mean of the absolute values for all the calculated differences is output from the actuator freeplay monitor 34 as the freeplay value for the selected time period, e.g., from $t_0$ to $t_1$.

In various embodiments, the freeplay value output from the actuator freeplay monitor 34 is stored in an electronic storage device, e.g., a database of the MPCS 26. Subsequently, the actuator freeplay monitor 34 can generate a freeplay value for a plurality of subsequent selected time periods, for example, from $t_2$ to $t_3$, from $t_4$ to $t_5$ ... and from $t_n$ to $t_{n+1}$. Each subsequent freeplay value can then be stored in the electronic storage device and used to perform freeplay trend analysis for the actuator 14 to predict necessary replacement or repair of the actuator 14. Furthermore, in various embodiments, the actuators freeplay module 34, as described above, can be implemented to substantially simultaneously perform freeplay calculations for multiple actuators 14.

As described above, the actuator 14 operates to control the system component 18 in accordance with torque commands received at the actuator controller 42 from a command source. In various embodiments, the command source is a discrete computer-based system configured to send a series of torque commands, or a waveform torque command, to the actuator controller 42 for a selected period of time, e.g., from $t_0$ to $t_1$. Generally, the series of torque commands or the torque command waveform is designed to oscillate the drive motor 28 between a direction that extends the output ram 30 and an opposite direction that retracts the output ram 30. Accordingly, the drive motor 28 moves the output ram 30 in response to the series of torque commands or torque command waveform. The actuator controller 42 monitors the actuator operational parameters and transmits the actuator operational parameter data waveforms 46, 50, 54 and 58 to the actuators freeplay module 34 that is stored on and executed by the discrete computer-based system. The actuators freeplay module 34 then calculates the freeplay value for the selected time period, as described above. In some implementations, the series of torque commands or the torque command waveform is designed to achieve a certain motor 28 velocity and have rapid reversals. Therefore, the actuator 14 will extend or retract the output ram 30, then make a rapid turn around and generate a fairly high acceleration. Thus, the series of torque commands or the torque command waveform is designed to accelerate the drive motor 28 at a particular velocity that is within a certain range. The series of torque commands or the torque command waveform is further designed to then reverse direction of the drive motor 28 within a certain time period and acquire the same velocity, or meet the velocity requirements, in the reverse direction.

In various other embodiments, the command source can be the MPCS 26, or any other computer-based subsystem of the structural system 22. Particularly, the MPCS 26, or other subsystem, can include the actuators freeplay module 34 and be configurable to send a series of torque commands, or a torque command waveform, to the actuator controller 42 for a selected period of time, e.g., from $t_0$ to $t_1$. As described above, the series of torque commands or the torque command waveform is generally designed to oscillate the drive motor 28 between a direction that extends the output ram 30 and an opposite direction that retracts the output ram 30. Thus, the drive motor 28 moves the output ram 30 in response to the series of torque commands, or torque command waveform, while the actuator controller 42 monitors the actuator operational parameters. The actuator operational parameter data waveforms 46, 50, 54 and 58 are then transmitted to the actuators freeplay module 34, which is executed by the MPCS 26 or other subsystem of the structural system 22 to calculate the freeplay value for the selected time period. In some implementations, the series of torque commands or the torque command waveform is designed achieve a certain motor 28 velocity and have rapid reversals, as described above.

In still other embodiments, the actuator freeplay monitoring system 10 is configured to execute the actuators freeplay module 34 to collect actuator parameter data and generate freeplay values during selected periods of operation of the structural system 22. Thus, the actuator controller 42 receives the torque commands from the MPCS 26 during operation of the structural system 22. The actuators freeplay module 34 is executed during various periods of operation to calculate and compile a plurality of actuator freeplay values that can be stored in a database of the MPCS 26, as described above. For example, in various embodiments the structural system 22 is an aircraft. The actuator freeplay module 34 can be executed to collect the actuator operational parameter data and calculate actuator freeplay values during various periods of operation of the aircraft.

Furthermore, in various embodiments the FMS 10 is applicable, as described above, within a digital environment. Further yet, in other embodiments, the FMS 10 is applicable, as described above, within an analog environment.

The FMS 10 allows assessment of the mechanical wear of the actuator 14 without physical removal of the actuator 14 from the structural system 22, thereby curtailing or eliminating the need for known methods of ground-based wear testing. By taking measurements only when specific 'acceptable' parameter data prerequisites are met, the accuracy of the measured freeplay is assured and consistent. Additionally, by performing this critical measurement frequently, the accuracy of the measurement is highly reliable, and long term trend identification is made feasible. Acquiring and storing freeplay measurements throughout the life of the actuator 14 support non-linear trending of wear and aid in the prediction of eventual failure.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification and following claims.

What is claimed is:

1. A method for monitoring freeplay within an actuator, said method comprising:
   collecting a plurality of actuator parameter data sets during a predetermined period as a drive motor of an actuator is commanded to repeatedly drive an output ram of the actuator between an extending direction and a retracting direction;
   selectively isolating various sets of the plurality of actuator parameter data sets that meet specific predetermined criterion; and
   computing an amount of freeplay value within the actuator based on the isolated actuator parameter data sets, the amount of freeplay indicative of an amount of mechanical wear within the actuator.

2. The method of claim 1, wherein the method further comprises:
   storing the freeplay value on an electronic storage medium;
   repeating the collecting of the plurality of actuator parameter data sets, the isolating of the various actuator data sets, and the computing of the freeplay value, for a plurality of subsequent predetermined periods to compile a plurality of subsequent freeplay values that are stored on the electronic storage medium; and performing trending analysis on the compiled freeplay values to predict potential failures of the actuator.

3. The method of claim 1, wherein collecting the plurality of actuator parameter data sets comprises operating the drive motor to drive the actuator output ram in accordance with a wave form command that oscillates the drive motor operation between the extending and retracting directions.

4. The method of claim 1, wherein collecting the plurality of actuator parameter data sets comprises performing identical filtering on each of a plurality of data types included in the actuator parameter data sets to remove noise from the actuator parameter data sets.

5. The method of claim 1, wherein collecting the plurality of actuator parameter data sets comprises normalizing at least some of a plurality of data types included in the actuator parameter data sets.

6. The method of claim 1, wherein selectively isolating various sets of the plurality of actuator parameter data sets comprises isolating only those actuator parameter data sets that comprise data having values within a predetermined range.

7. The method of claim 6, wherein computing an amount of freeplay value comprises calculating the freeplay value utilizing only the isolated actuator parameter data sets.

8. The method of claim 1, wherein the method comprises substantially simultaneously collecting of the plurality of actuator parameter data sets, isolating of the various actuator data sets, and computing of the freeplay value of a plurality of actuators.

9. A method for monitoring freeplay within an actuator that controls movement of a control surface of the mobile platform, said method comprising:
   generating at least:
      an actuator drive motor position signal comprising a plurality of motor position data indicative of a position of a drive motor of an actuator during a predetermined data collection period as the drive motor is commanded to repeatedly drive an output ram of the actuator between an extending direction and a retracting direction;
      a drive motor velocity signal comprising a plurality of motor velocity data indicative of the drive motor velocity during the data collection period, and
      an actuator output ram position signal comprising a plurality of ram position data indicative of the actuator output ram position during the data collection period;
   collecting a plurality of actuator parameter data sets during the data collection period, each actuator parameter data set comprising a motor position data value, a motor velocity data value and a ram position data value;
   selectively isolating various sets of the plurality of actuator parameter data sets that include a motor position data value within a motor position range, a motor velocity data value within a motor velocity range and a ram position data value within a ram position range; and
   computing an amount of freeplay value within the actuator for the data collection period based on the isolated actuator parameter data sets, the amount of freeplay indicative of an amount of mechanical wear within the actuator.

10. The method of claim 9, wherein the method further comprises:
   storing the freeplay value on an electronic storage medium;
   repeating the generation of the motor position, motor velocity and ram position signals, the collecting of the plurality of actuator parameter data sets, the isolating of the various actuator data sets, and the computing of the freeplay value, for a plurality of subsequent predetermined periods to compile a plurality of subsequent freeplay values that are stored on the electronic storage medium; and
   performing trending analysis on the compiled freeplay values to predict potential failures of the actuator.

11. The method of claim 9, wherein generating the motor position, the motor velocity and the ram position signals comprises operating the drive motor to drive the actuator output ram in accordance with a wave form command that oscillates the drive motor operation between the extending and retracting directions.

12. The method of claim 9, wherein collecting the plurality of actuator parameter data sets comprises performing identical filtering on each of the motor position signal, the motor velocity signal and the ram position signal to remove noise from the motor position signal, the motor velocity signal and the ram position signal.

13. The method of claim 9, wherein collecting the plurality of actuator parameter data sets comprises normalizing the motor position signal and the ram position signal.

14. The method of claim 9, wherein computing an amount of freeplay value comprises calculating a mean value of the lag between the motor position and the ram position utilizing the isolated actuator parameter data sets.

15. The method of claim 9, wherein the method comprises substantially simultaneously collecting of the plurality of actuator parameter data sets, isolating of the various actuator data sets, and computing of the freeplay value of a plurality of actuators.

16. A system for monitoring the reliability status of a mobile platform actuator that controls movement of a control surface of the mobile platform, said system comprising:
   a mobile platform computing system adapted to generate at least:
      an actuator drive motor position signal comprising a plurality of motor position data indicative of a drive motor position during a predetermined data collection period as the drive motor is commanded to repeatedly drive an actuator output ram between an extending direction and a retracting direction;
      a drive motor velocity signal comprising a plurality of motor velocity data indicative of the drive motor velocity during the data collection period, and
      an actuator output ram position signal comprising a plurality of ram position data indicative of the actuator output ram position during the data collection period; and
   an actuator freeplay monitor module operable in cooperation with the mobile platform computing system, the actuator freeplay monitor module adapted to:
      collect a plurality of actuator parameter data sets during the data collection period, each actuator parameter data set comprising a motor position data value, a motor velocity data value and a ram position data value;
      selectively isolate various sets of the plurality of actuator parameter data sets that include a motor position data value within a motor position range, a motor velocity data value within a motor velocity range and a ram position data value within a ram position range; and generate an amount of freeplay value within the actuator for the data collection period based on the isolated actuator parameter data sets.

17. The system of claim 16, wherein to generate the motor position, the motor velocity and the ram position signals, the mobile platform computing system is further adapted to operate the drive motor to drive the actuator output ram in accordance with a wave form command that oscillates the drive motor operation between the extending and retracting directions.

18. The system of claim 16, wherein to collect the plurality of actuator parameter data sets, the actuator freeplay monitor module is further adapted to perform identical filtering on each of the motor position signal, the motor velocity signal and the ram position signal to remove noise from the motor position signal, the motor velocity signal and the ram position signal.

19. The system of claim 16, wherein to collect the plurality of actuator parameter data sets, the actuator freeplay monitor module is further adapted to normalize the motor position signal and the ram position signal.

20. The system of claim 16, wherein to compute an amount of freeplay value, the actuator freeplay monitor module is further adapted to calculate a mean value of the lag between the motor position and the ram position utilizing the isolated actuator parameter data sets.

* * * * *